(12) United States Patent
Ergun et al.

(10) Patent No.: US 12,035,727 B2
(45) Date of Patent: Jul. 16, 2024

(54) ORGANIC WATER-BASED RELEASE COATING

(71) Applicant: Vantage Specialty Chemicals, Inc., Chicago, IL (US)

(72) Inventors: Roja Ergun, Pittsburgh, PA (US); Gina Carretta, Pittsburgh, PA (US)

(73) Assignee: Vantage Specialty Chemicals, Inc., Chicago, IL (US)

( * ) Notice: Subject to any disclaimer, the term of this patent is extended or adjusted under 35 U.S.C. 154(b) by 50 days.

(21) Appl. No.: 17/330,988

(22) Filed: May 26, 2021

(65) Prior Publication Data

US 2021/0368817 A1    Dec. 2, 2021

Related U.S. Application Data

(60) Provisional application No. 63/030,282, filed on May 26, 2020.

(51) Int. Cl.
*A23D 7/005* (2006.01)
*A23D 7/01* (2006.01)
*A23D 7/04* (2006.01)
*A23D 7/06* (2006.01)

(52) U.S. Cl.
CPC ........... *A23D 7/0053* (2013.01); *A23D 7/011* (2013.01); *A23D 7/04* (2013.01); *A23D 7/06* (2013.01)

(58) Field of Classification Search
CPC ........ A23D 7/0053; A23D 7/011; A23D 7/04; A23D 7/06
See application file for complete search history.

(56) References Cited

U.S. PATENT DOCUMENTS

| | | | |
|---|---|---|---|
| 4,339,465 A | 7/1982 | Strouss | |
| 4,547,388 A | 10/1985 | Strouss | |
| 5,503,866 A | 4/1996 | Wilhelm, Jr. | |
| 5,662,956 A | 9/1997 | Knightly | |
| 6,613,376 B2 | 9/2003 | Smith et al. | |
| 6,852,349 B2 | 2/2005 | Smith et al. | |
| 8,795,757 B2 | 8/2014 | Schrader et al. | |
| 9,861,611 B2 | 1/2018 | Bromley | |
| 2004/0115332 A1 | 6/2004 | Teran et al. | |
| 2011/0274799 A1 | 11/2011 | Wilhelm, Jr. et al. | |
| 2013/0004621 A1* | 1/2013 | Schrader | A23L 33/15 426/250 |

(Continued)

FOREIGN PATENT DOCUMENTS

| | | |
|---|---|---|
| JP | 5779289 | 9/2015 |
| JP | 2019047782 | 3/2019 |
| WO | 1994022313 | 10/1994 |

OTHER PUBLICATIONS

International Search Report issued for Application No. PCT/US2021/034222, dated Sep. 9, 2021.

(Continued)

*Primary Examiner* — Donald R Spamer
*Assistant Examiner* — Assaf Zilbering
(74) *Attorney, Agent, or Firm* — Dorsey & Whitney LLP

(57) ABSTRACT

Water-based release coatings are disclosed. The water-based release coatings include a homogenous blend of water, a surfactant comprising saponin glycosides, and lecithin. The mixture of saponin glycosides are preferably derived from the *Quillaja* plant. The release coatings can be used for reducing or preventing build-up on a cooking surface.

13 Claims, 5 Drawing Sheets

(56) References Cited

U.S. PATENT DOCUMENTS

2018/0325970 A1   11/2018   Suarez et al.

OTHER PUBLICATIONS

Yang, et al., "Chapter Two—Chemical Synthesis of Saponins", Advances in Carbohydrate Chemistry and Biochemistry, vol. 79, pp. 63-150, 2021, ISSN 0065-2318, ISBN 9780128246269, Elsevier B.V. Only Abstract Provided.

* cited by examiner

Dehydrated Apples (Before Release)

Dehydrated Apples (After Release)

ORGANIC WATER-BASED RELEASE COATING

CROSS REFERENCE TO RELATED APPLICATIONS

This application claims the benefit of priority to U.S. Provisional Application No. 63/030,282, filed May 26, 2020, which is incorporated by reference herein in its entirety.

FIELD

The disclosed subject matter relates generally to release coatings for use in cooking, that can be stored for extended periods of time.

BACKGROUND

Release coatings have long been used in cooking. The growing popularity of health foods and natural foods has greatly increased the need for organic release coatings. Organic oil-based release coatings are currently used in dried fruits and jerky types of applications, even though they are not ideal for these applications. Some of the drawbacks of the oil-based release coatings for these applications include oily surfaces, difficulty of cleaning, ineffective release, and inferior finished product quality. There is a need for organic water-based release coatings for use in cooking to address those unmet needs that also have a long storage life. The compositions and methods disclosed herein address these and other needs.

SUMMARY

Disclosed herein are water-based release coatings. The components in the release coatings are preferably organic and/or food grade, and/or only include ingredients that are generally recognized as safe (GRAS), as determined under sections 201(s) and 409 of the Federal Food, Drug, and Cosmetic Act (the Act). The release coatings can be in the form of an oil-in-water emulsion, preferably an emulsion that is stable for at least 6 months. The release coatings include a homogenous blend of water, a surfactant comprising saponin glycosides, and lecithin. The saponin glycosides can be derived from a plant. Saponin extracts comprising at least 10% by weight sapogenin content and obtained from the *Quillaja* plant are particularly suitable surfactants for use in the release coatings. The surfactant (such as the saponin extract from the *Quillaja* plant) can be present in an amount of 20% by weight or less (for e.g., 15% by weight or less, 10% by weight or less, from 1% to 20% by weight, from 1% to 15% by weight, or from 1% to 10% by weight), based on the total weight of the release coating. Generally, the surfactant in the release coatings does not comprise a synthetically derived surfactant.

As described herein, the release coatings are water-based. Water can be present in an amount of 40% by weight or greater (for e.g., 50% by weight or greater, 75% by weight or greater, 85% by weight or greater, from 40% to 95% by weight, or from 75% to 90% by weight), based on the total weight of the release coating.

Lecithin is also present in the release coatings. The lecithin is preferably an unmodified lecithin derived from a plant source, such as from sunflower, soybean, rapeseed (e.g., canola), corn, or cottonseed. However, synthetic lecithin may also be used in the release coatings. Lecithin can be present in an amount of 25% by weight or less (for e.g., 20% by weight or less, 15% by weight or less, 10% by weight or less, from 5% to 25% by weight, from 5% to 15% by weight, or from 7.5% to 15% by weight), based on the total weight of the release coating. The weight ratio of lecithin to the total amount of surfactant can be from 1:2 to 20:1, from 1:2 to 10:1, or from 1:1 to 7.5:1.

The release coatings can further comprise an oil. The oil can include one or more of a plant derived oil or an animal derived oil. For example, the oil can include soybean oil, corn oil, cottonseed oil, peanut oil, safflower oil, sunflower oil, palm oil, coconut oil, rice bran oil, rapeseed oil, ground nut oil, grapeseed oil, ghee, canola oil, olive oil, vegetable oil, flax oil, hemp oil, borage oil, avocado oil, pumpkin oil, wheatgerm oil, evening primrose oil, or starflower oil. The oil may be at least partially hydrogenated, fractionated, or otherwise modified. When present, the oil can be in an amount greater than, equal to, or less than the amount of lecithin. In some instances, the oil can be present in an amount of 25% by weight or less (for e.g., 20% by weight or less, 15% by weight or less, 10% by weight or less, 7.5% by weight or less, from 0.5% to 25% by weight, from 0.5% to 15% by weight, from 0.5% to 7.5% by weight, or from 0.5% to 5% by weight), based on the total weight of the release coating. The weight ratio of lecithin and oil to the surfactant can be from 1:2 to 20:1 (for e.g., from 1:2 to 10:1, from 1:1 to 10:1, or from 2:1 to 5:1). In some embodiments of the release coatings, an oil is not present.

The release coatings can further comprise a preservative. Suitable examples of preservatives include acetic acid, citric acid, benzoic acid, or mixtures thereof. Additional additives present in the release coatings can include an antimicrobial agent, a coloring agent, an antioxidant, a flavoring agent, or a combination thereof.

In some examples, the release coatings can include from 40% to 95% by weight water, from 1% to 20% by weight of the saponin extract derived from the *Quillaja* plant, from 2% to 25% by weight of lecithin, and from 0.1% to 5% by weight of acetic acid. In further examples, the release coating can be formulated as a concentrate. The concentrate can include less than 70% by weight water, from 3% to 50% by weight of the surfactant comprising saponin glycosides, and from 3% to 50% by weight of lecithin.

The release coatings can be prepared such that the viscosity is from 10 to 10,000 cps at 20° C.

An aerosol composition comprising an aerosol container containing the release coating disclosed herein and a propellant are also described.

Methods of preparing the release coatings are also disclosed. The methods can include mixing in a high shear mixer, water, a surfactant comprising saponin glycosides, and lecithin to form the release coating. The ingredients in the release coating can be mixed simultaneously or sequentially. In some cases, the order of addition can be important, depending on the ingredients in the release coatings. For example, when an oil is present the method can include mixing in a high shear mixer, water, a surfactant comprising saponin glycosides, and an oil to form a pre-mix; aging the pre-mix preferably for at least 12 hours; and mixing in a high shear mixer, the aged pre-mix, lecithin, additional water, and acetic acid to form the release coating. In other examples, the method can include mixing in a high shear mixer, water, a surfactant comprising saponin glycosides, lecithin, and a preservative to form a pre-mix; aging the pre-mix preferably for at least 12 hours; and mixing in a high shear mixer, the aged pre-mix and additional water to form the release coating. The method can further comprise mixing an oil with the pre-mix.

The release coatings may form droplets, wherein at least 80% of the droplets have a droplet size below 100 microns (for e.g., from 0.1 to 100 microns or from 10 to 50 microns). The median droplet size can be from 0.1 to 30.0 microns.

The release coatings can be used to reduce or prevent baked, dehydrated or shaped foods from sticking to cooking or drying surfaces. The release coatings also have several additional uses including reducing or preventing carbon build-up on a cooking surface or cleaning (or decarbonizing) a cooking surface that has a carbon or other residual buildup. The cooking surface can be a glass, a metal, a glazed metal, a polymer (such as silicone or polytetrafluoroethylene), a composite (including natural and synthetic composites such as ceramic), or a combination thereof (such as a composite coated with a polymer). In some examples, the cooking surface can be a baking equipment, such as an oven band, a baking pan, a grilling surface, or a dehydrator surface.

The method of using the release coating to reduce or prevent build-up on a cooking surface can include applying the release coating to the cooking surface, and heating a cooking product on the cooking surface, whereby build-up is reduced compared to an uncoated cooking surface or prevented during the cooking process. The method of using the release coating to clean a cooking surface that has a buildup can include applying the release coating to the cooking surface, allowing the release coating to set, and wiping or washing the cooking surface to remove the carbon buildup. In the method of using the release coating to clean a cooking surface that has a carbon and/or residual product buildup, the method can include continually using the release coating in normal processing (without heating) conditions. The release coating can be mixed with a propellant prior to applying to the cooking surface. The propellant can be selected from compressed air, ethanol, nitrogen, carbon dioxide, nitrous oxide, hydrofluoroalkanes (HFA), 1,1,1,2,-tetrafluoroethane, 1,1,1,2,3,3,3-heptafluoropropane, or combinations thereof. The release coating can be applied by spraying such as from a spray system, an aerosol container, or by brushing. The methods of cleaning buildup from a cooking surface can further include heating the cooking surface prior to or after applying the release coating. The release coating can be allowed to set for at least 1 minute prior to heating and/or cooking on the surface.

Additional advantages will be set forth in part in the description which follows, and in part will be obvious from the description, or may be learned by practice of the subject matter disclosed herein. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several embodiments of the invention and together with the description, serve to explain the principles of the disclosed subject matter.

FIG. 1A shows samples prepared using whey protein (left) and casein (right). FIG. 1B shows samples prepared using gum acacia (left) and lecithin (right). FIG. 1C shows samples prepared using pea protein (left) and *Quillaja* extract (right). FIG. 1D shows a commercial water-based release agent sample.

DETAILED DESCRIPTION

Figure 1A:
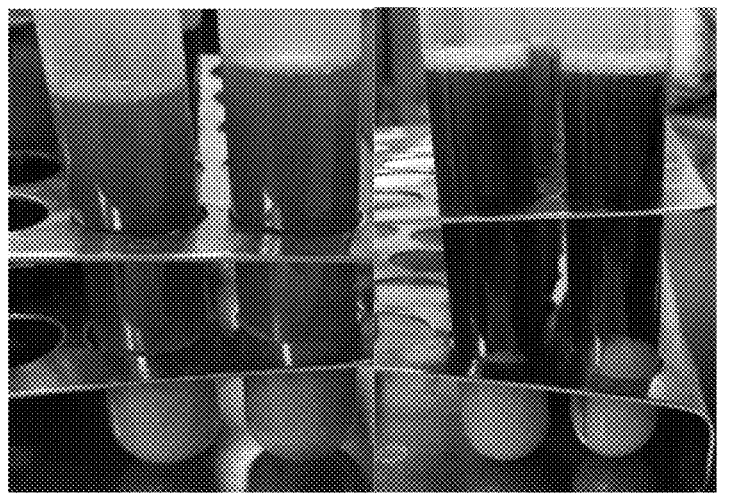
FIGS. 1A-1D show microscopic images of release coating samples prepared using various emulsifiers and centrifuged to evaluate shelf life.
Figure 1A:
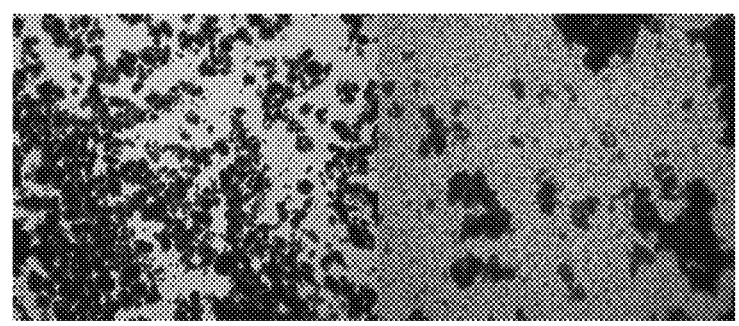
Figure 1B:
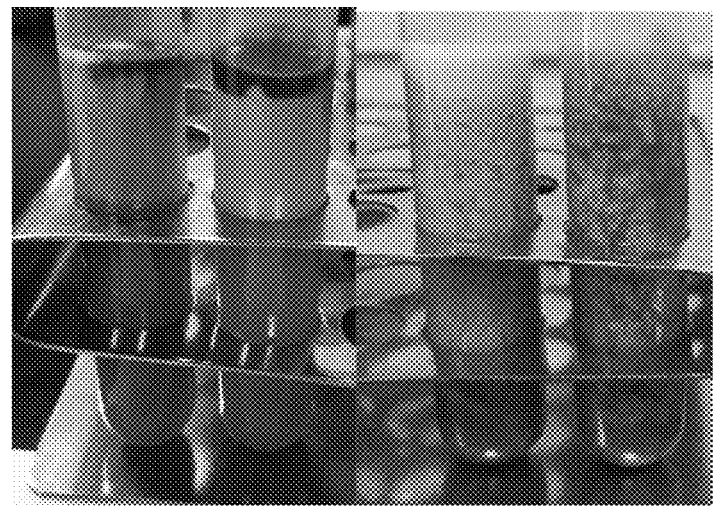
Figure 1B:
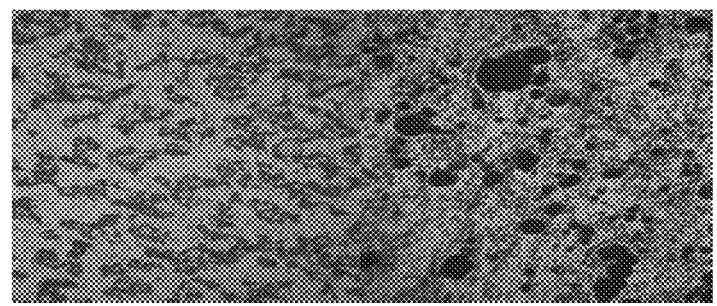
Figure 1C:
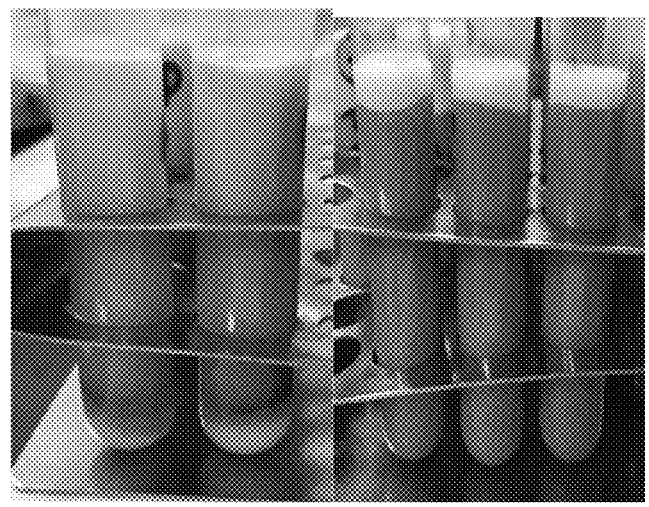
Figure 1C:
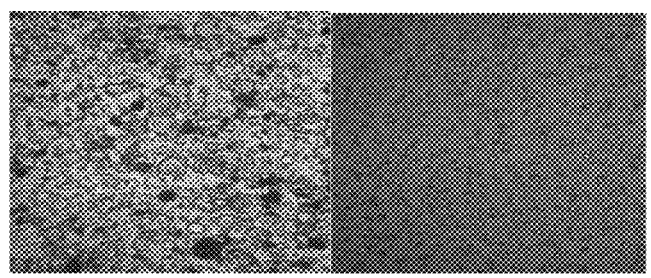
Figure 1D:
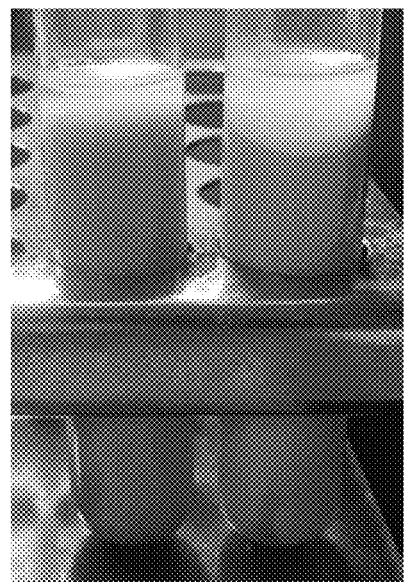
Figure 1D:
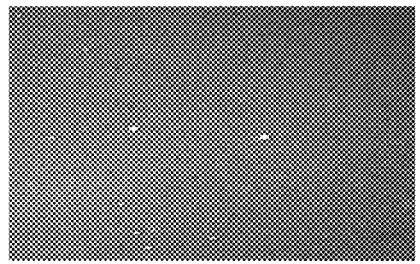

The disclosed subject matter can be understood more readily by reference to the following detailed description and the Examples included herein and to the Figures and their previous and following description.

Definitions

Before the present compounds, compositions, and methods are disclosed and described, it is to be understood that this invention is not limited to specific synthetic methods, or specific route of administration, as such may, of course, vary. It is also to be understood that the terminology used herein is for the purpose of describing particular embodiments only and is not intended to be limiting.

Throughout this application, various publications are referenced. The disclosures of these publications in their entireties are hereby incorporated by reference into this application in order to more fully describe the state of the art to which this invention pertains.

As used in the specification and the appended claims, the singular forms "a," "an," and "the" include plural referents unless the context clearly dictates otherwise. Thus, for example, reference to "a glycoside" includes mixtures of such glycosides and the like.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a," "an," "the," include plural referents unless the context clearly dictates otherwise.

It will be further understood that the endpoints of each of the ranges are significant both in relation to the other endpoint, and independently of the other endpoint. Unless stated to the contrary, the term "about" means within 5%, e.g., within 1, 2, 3, or 4% of the stated value, or less.

"Optional" or "optionally" means that the subsequently described event or circumstance does or does not occur, and that the description includes instances where said event or circumstance occurs and instances where it does not. For example, the phrase "optionally a preservative" means that the preservative is or is not present in the release coatings and that the description includes release coatings with and without the preservative.

Compositions

Disclosed herein are water-based release coatings. The water-based release coatings can be organic, that is, all the ingredients used in the release coatings can be organic. The term "organic" as used herein refers to release coatings with no artificial or synthetic ingredients (including additives such as color additives). In some embodiments of the organic water-based release coatings, the ingredients do not involve the use of synthetic pesticides or fertilizers, and producers of which can be certified for adhering to standards and requirements stipulated by the appropriate regulating body, such as the USDA National Organic Program (NOP). In the United States, for example, organic producers comply with the "National List of Allowed and prohibited Substances" which identifies substances which may be used and the non-synthetic substances that cannot be used in organic production.

Typically, the ingredients used in the water-based release coatings are Generally Recognized As Safe (GRAS) Under sections 201(s) and 409 of the Federal Food, Drug, and Cosmetic Act (the Act), any substance that is intentionally added to food is a food additive, that is subject to premarket review and approval by FDA, unless the substance is generally recognized, among qualified experts, as having been adequately shown to be safe under the conditions of its intended use, or unless the use of the substance is otherwise excepted from the definition of a food additive. The use of a food substance may be GRAS either through scientific procedures or through experience based on common use in food.

The release coatings can include a homogenous blend of water, a surfactant comprising saponin glycosides, and lecithin. As described herein, all the ingredients including the surfactant and lecithin can be organic. The term "homogenous blend" as used herein refers to a uniform mixture of components in the release coatings. The homogenous blend of the release coatings can be in the form of an oil-in-water emulsion. The oil-in-water emulsion is generally stable for at least 6 months, preferably for at least 9 months, most preferably for at least 12 months, without the need for refrigeration or a sealed container.

The release coatings are water-based, that is, they comprise an aqueous continuous phase. Water can be present in an amount of 40% by weight or greater (for e.g., 45% by weight or greater, 50% by weight or greater, 55% by weight or greater, 60% by weight or greater, 65% by weight or greater, 70% by weight or greater, 75% by weight or greater, 80% by weight or greater, 85% by weight or greater, 90% by weight or greater, or 95% by weight or greater), based on the total weight of the release coating. In some embodiments, water can be present in an amount of 95% by weight or less (e.g., 94% by weight or less, 93% by weight or less, 92% by weight or less, 91% by weight or less, 90% by weight or less, 89% by weight or less, 88% by weight or less, 86% by weight or less, 85% by weight or less, 80% by weight or less, 75% by weight or less, 70% by weight or less, 65% by weight or less, 60% by weight or less, 55% by weight or less, 50% by weight or less, 45% by weight or less, or 40% by weight or less), based on the total weight of the release coating. In some embodiments, water can be present in an amount from 40 to 95% by weight (e.g., from 50 to 95% by weight, from 60 to 95% by weight, from 65 to 95% by weight, from 75 to 95% by weight, from 80 to 95% by weight, from 40 to 90% by weight, from 40 to 85% by weight, from 50 to 90% by weight, or from 50 to 85% by weight), based on the total weight of the release coating.

The release coating can be in the form of a concentrate. The concentrate may or may not comprise water. In some examples, the concentrate can include water in an amount of 75% by weight or less (for e.g., 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, 15% by weight or less, 10% by weight or less, or 5% by weight or less), based on the total weight of the release coating concentrate. In some embodiments, water can be present in an amount from greater than 0 to 75% by weight (for e.g., from 5 to 75% by weight, from 20 to 75% by weight, from 30 to 75% by weight, from 40 to 75% by weight, from 40 to 70% by weight, from 40 to 65% by weight, from 40 to 60% by weight, from 40 to 55% by weight, from 40 to 50% by weight, from 45 to 55% by weight, from 45 to 60% by weight, from 45 to 65% by weight, or from 50 to 60% by weight), based on the total weight of the release coating concentrate.

The concentrate can be a stable oil in water emulsion. Because the concentrate is a stable emulsion, additional water can be added without causing the constituents to separate. The stability of the emulsion is not threatened by changes in the volume percentages, so long as the changes are not carried to an extreme. The concentrate emulsion can be mixed with additional water in a volumetric ratio of 1 part emulsion to 1 part additional water, up to 1 part emulsion to 10 parts additional water. Thus, the release agent can be stored in "concentrated" form, then diluted to an appropriate concentration for use later.

Surfactants

The release coatings include a surfactant comprising a heterogenous mixture of saponin glycosides. Saponins are a class of compounds which are characterized by their structure containing a triterpene or steroid aglycone and one or more sugar (glycoside) moieties. The heterogenous mixture of saponin glycosides as described herein refers to a mixture of saponin molecules varying both in their aglycone and sugar moieties. The surfactant used in the release coatings can be naturally or synthetically derived. However, in the organic water-based release coatings, the surfactant is preferably a plant derived surfactant. In some embodiments, the release coatings do not include a synthetically derived surfactant.

Particularly suitable surfactants for use in the release coatings described herein include the natural saponin extract from the *Quillaja* plant, more particularly, from the bark and/or biomass of *Quillaja Saponaria Molina*. Methods of preparation of the saponin extract from the *Quillaja* plant are known in the art and the extract can be obtained by milling, extraction, removal of both undesirable accompanying substances from the extracts and undesirable solvents, and concentration among other processes. The identity of the *Quillaja* sapogenins can be determined by reverse phase-high performance liquid chromatography (RP-HPLC) and further, if desired, by hydrophilic interaction chromatography (HILIC). Paul M. Kuznesof et al., $65^{th}$ JECFA, Chemical and Technical Assessment 2005, *Quillaja* Extracts Type 1 and Type 2, provides standard extraction and identification methods for *Quillaja* sapogenins, the disclosure of which is incorporated herein by reference in its entirety.

The saponins can be obtained industrially as powder or liquid extracts and may be in a purified state, partially purified state or unpurified state. *Quillaja* saponin extracts have a specific profile of saponins. In all cases, the profiles of these extracts include saponins having a main aglycone (sapogenin) moiety derived from quillaic acid (a triterpene of predominantly 30-carbon atoms). The aglycone is bound to various sugars including glucose. In general, the entire extracts of *Quillaja Saponaria Molina* contain over 100 types of chemically different saponins. U.S. Publication No. 2018/0325970 describes several commercial extracts of *Quillaja Saponaria* useful for the present disclosure including, but not limited to, Ultra Dry® 100-Q (*Quillaja Saponaria Molina* powder extract, mainly containing triterpene saponins up to 65% w/w); *Quillaja* Dry 100 (*Quillaja Saponaria Molina* powder extract, mainly containing triterpene saponins up to 25% w/w); Vax Sap® (highly purified *Quillaja Saponaria Molina* powder extract mainly containing triterpene saponins >90% w/w); QL 1000 (liquid extract mainly of *Quillaja Saponaria Molina* at a concentration of 8% w/v of saponins); and QL Perm (liquid extract mainly of *Quillaja Saponaria Molina* at a concentration of 2% w/v of saponins). Other commercial extracts of *Quillaja Saponaria* useful for the present disclosure include, but are not limited to, Saponin *Quillaja* sp. (*Quillaja Saponaria Molina* powder extract, mainly containing triterpene saponins up to 35% w/w); Sapnov™ (liquid extract mainly of *Quillaja Saponaria Molina* at a concentration of 65-75% dried weight of saponins); FOAMEX™ (*Quillaja Saponaria Molina* powder extract, mainly containing triterpene saponins above 20% w/w); Q-Naturale® (liquid extract mainly of *Quillaja Saponaria Molina* at a concentration of 65-75% dried weight of saponins); Andean Q-Ultra (liquid extract mainly of *Quillaja Saponaria* Molina at a concentration of approximately 14.5% w/w of saponins); Nature's Foam U65 (liquid extract mainly of *Quillaja Saponaria Molina* at a concentration of above 65% saponins on a dry basis); Nature's Foam 46.5 (liquid extract mainly of *Quillaja Saponaria Molina* at a concentration of above 9% w/w saponins); Nature's Foam Powder (powder extract mainly of *Quillaja Saponaria Molina* at a concentration of above 20% w/w saponins); *Quillaja* Refined Saponins Powder—70% (*Quillaja Saponaria Molina* powder extract, mainly containing triterpene saponins at or above 60% w/w); *Quillaja* Refined Saponins Powder—20% (*Quillaja Saponaria Molina* powder extract, mainly containing triterpene saponins at or above 16% w/w); Andean QDP Ultra (powder extract mainly of *Quillaja Saponaria Molina* at a concentration of at or above 60% w/w saponins); and *Quillaja Saponaria* Extract Powder, 100% Food Grade Raw Material (*Quillaja Saponaria Molina* powder extract, containing triterpene saponins at or above 16% w/w).

For the purposes of the present disclosure, a distinction is made between *Quillaja* extracts of Type 1 and Type 2. A *Quillaja* extract of Type 1 is obtained by aqueous extraction from the minced bark or from the wood of the *Quillaja* tree and subsequent purification. The total saponin content in the Type 1 extract is between 10-30% on a dried basis. Type 2 *Quillaja* extract is subjected to additional purification steps, such as ultrafiltration, membrane filtration or affinity chromatography to yield a total sapogenin content of approximately 65% to 90% on a dried basis. The saponin content in the extract of Type 2 is higher than in Type 1, because Type 1 is less purified than Type 2. In the present disclosure, a *Quillaja* extract of Type 1 or Type 2 can be used, but type 2 is preferably used. The total sapogenin content of *Quillaja* extract used, is at least 10% by weight of the extract (for e.g., at least 15% by weight, at least 20% by weight, at least 25% by weight, at least 30% by weight, at least 40% by weight, at least 50% by weight, at least 60% by weight, at least 70% by weight, at least 80% by weight, or at least 90% by weight).

In the release coatings, the total content of sapogenins can range from 500 ppm to 200,000 ppm. For example, the total amount of sapogenins present in the release coating can be 600 ppm or greater (for e.g., 800 ppm or greater, 1,000 ppm or greater, 1,500 ppm or greater, 2,000 ppm or greater, 5,000 ppm or greater, 10,000 ppm or greater, 15,000 ppm or greater, 20,000 ppm or greater, 30,000 ppm or greater, 40,000 ppm or greater, 50,000 ppm or greater, 60,000 ppm or greater, 70,000 ppm or greater, 75,000 ppm or greater, 80,000 ppm or greater, 90,000 ppm or greater, 100,000 ppm or greater, 110,000 ppm or greater, 120,000 ppm or greater, 130,000 ppm or greater, 140,000 ppm or greater, 150,000 ppm or greater, 160,000 ppm or greater, 170,000 ppm or greater, or 180,000 ppm or greater). In some embodiments, the total amount of sapogenins present in the release coating can be 200,000 ppm or less (for e.g., 180,000 ppm or less, 170,000 ppm or less, 160,000 ppm or less, 150,000 ppm or less, 140,000 ppm or less, 130,000 ppm or less, 120,000 ppm or less, 110,000 ppm or less, 100,000 ppm or less, 90,000 ppm or less, 80,000 ppm or less, 70,000 ppm or less, 60,000 ppm or less, 50,000 ppm or less, 40,000 ppm or less, 30,000 ppm or less, 20,000 ppm or less, 15,000 ppm or less, 10,000 ppm or less, or 5,000 ppm or less). In some embodiments, total amount of sapogenins present in the release coating can be from 800 to 180,000 ppm, from 1,000 to 180,000 ppm, from 5,000 to 180,000 ppm, from 10,000 to 180,000 ppm, from 1,000 to 150,000 ppm, from 5,000 to 150,000 ppm, or from 10,000 to 150,000 ppm.

The release coatings can include one or more additional surfactants. For example, other suitable surfactants for use in the release coatings described herein include natural saponin extract from *Bupleurum falcatum, Camellia oleifera, Camellia sinensis Desmodium adscendens, Gypsophila, Panax quinqufolius, Panax japonicas, Sapindus delavayi, Sapindus mukorossi, Sapindus marginatus, Sapindus saponaria, Sapindus trifoliatus, Saponaria officinalis, Styrax japonica, Yucca schidigera*, shikakai, soy beans, beans, peas (*Pisum sativum*), lucerne, tea, spinach, sugar beet, *quinoa*, liquorice, sunflower, horse chestnut, *ginseng*, oats, *capsicum* peppers, aubergine, tomato seed, alliums, asparagus, yam, fenugreek, yucca and ginseng, lucerne, mung beans, or any mixture thereof. Any part of the plant may be used for extracting the saponin material, including leaves, stems, roots, bulbs, blossom and fruit (including the skin, flesh and seed of the fruit).

In some instances, the one or more additional surfactants can include a nonionic, an anionic, a cationic, or a zwitterionic surfactant. In some cases, the release coatings can include an additional nonionic surfactant such as nonionic alcohol ethoxylates, organic plant based and animal proteins, and/or organic plant and animal-based hydrocolloids including pea protein, whey, casein, gum acacia, locust bean gum, and others. In some embodiments, the only surfactant present in the release coatings is the saponin glycosides derived from the *Quillaja* plant.

As used herein, the saponin used in the release coating is at least one naturally obtained saponin compound. When isolated from a natural source, the at least one saponin may be used in its substantially pure form (namely at least 85%, 87%, 92%, 95%, or 98% purity), or may be used as a saponin-containing ex tract. The saponin-containing extract used can comprise between 0.2% and 99 wt % (such as from 10-60 wt %, from 10-50 wt %, from 10-4.0 wt %, from 10-30 wt %, from 10-20 wt %, or from 0.2-10 wt %) saponins out of the total weight of the dry content of the extract.

The total amount of surfactant (such as the saponin extract from the *Quillaja* plant) present in the release coating can be in an amount of 20% by weight or less (for e.g., 18% by weight or less, 17% by weight or less, 16% by weight or less, 15% by weight or less, 14% by weight or less, 13% by weight or less, 12% by weight or less, 11% by weight or less, 10% by weight or less, 9% by weight or less, 8% by weight or less, 7% by weight or less, 6% by weight or less, 5% by weight or less, 4% by weight or less, 3% by weight or less, or 2% by weight or less), based on the total weight of the release coating. In some embodiments, total amount of surfactant (such as the saponin extract from the *Quillaja* plant) present in the release coating can be in an amount of 1% by weight or greater (for e.g., 2% by weight or greater, 3% by weight or greater, 4% by weight or greater, 5% by weight or greater, 6% by weight or greater, 7% by weight or greater, 8% by weight or greater, 9% by weight or greater, 10% by weight or greater, 12% by weight or greater, 14% by weight or greater, 15% by weight or greater, 16% by weight or greater, 18% by weight or greater, or 20% by weight or greater), based on the total weight of the release coating. In some embodiments, the total amount of surfactant (such as the saponin extract from the *Quillaja* plant) present in the release coating can be in an amount from 1 to 20% by weight (for e.g., from 2 to 20% by weight, from 1 to 18% by weight, from 2 to 18% by weight, from 1 to 15% by weight, from 2 to 15% by weight, from 1 to 10% by weight, from 2 to 10% by weight, from 1 to 7.5% by weight, from 2 to 7.5% by weight, from 3 to 20% by weight, from 3 to 15% by weight, from 3 to 10% by weight, from 4 to 20% by weight, or from 4 to 10% by weight), based on the total weight of the release coating.

When the release coatings are formulated as a concentrate, the total amount of surfactant (such as the saponin extract from the *Quillaja* plant) present in the release coating can be in an amount of 5% by weight or greater (for e.g., 10% by weight or greater, 15% by weight or greater, 20% by weight or greater, 25% by weight or greater, 30% by weight or greater, 35% by weight or greater, 40% by weight or greater, 45% by weight or greater, or 50% by weight or greater), based on the total weight of the release coating concentrate. In some embodiments, the total amount of surfactant present can be in an amount from greater than 1 to 50% by weight (for e.g., from 5 to 50% by weight, from 5 to 45% by weight, from 5 to 40% by weight, from 10 to 50% by weight, from 10 to 45% by weight, from 10 to 40% by weight, from 15 to 50% by weight, from 15 to 40% by weight, or from 15 to 35% by weight), based on the total weight of the release coating concentrate.

Lecithin

Lecithin is a mixture comprising polar lipids (>80% by weight), including phospholipids, glycolipids, and fatty acids. Phosphatidylcholine, which is a polar lipid, is present in lecithin in concentrations of 20 to 90%. The lecithin used in the present disclosure is preferable produced from vegetable sources, but may be produced from animal or microbial sources, or synthesized as well. Plant lecithins are considered to be GRAS (generally regarded as safe). In some embodiments, the lecithin present in the release coatings is an unmodified lecithin derived from a plant source, such as from sunflower, soybean, rapeseed (such as canola), corn, or cottonseed, preferably sunflower lecithin.

The lecithin can be present in an amount of 25% by weight or less (for e.g., 23% by weight or less, 20% by weight or less, 18% by weight or less, 17% by weight or less, 16% by weight or less, 15% by weight or less, 14% by weight or less, 13% by weight or less, 12% by weight or less, 11% by weight or less, 10% by weight or less, 9% by weight or less, 8% by weight or less, 7% by weight or less, 6% by weight or less, 5% by weight or less, 4% by weight or less, 3% by weight or less, or 2% by weight or less), based on the total weight of the release coating. In some embodiments, the lecithin can be present in an amount of 2% by weight or greater (for e.g., 3% by weight or greater, 4% by weight or greater, 5% by weight or greater, 6% by weight or greater, 7% by weight or greater, 8% by weight or greater, 9% by weight or greater, 10% by weight or greater, 12% by weight or greater, 14% by weight or greater, 15% by weight or greater, 16% by weight or greater, 18% by weight or greater, 20% by weight or greater, or 25% by weight or greater), based on the total weight of the release coating. In some embodiments, the lecithin can be present in an amount from 2 to 25% by weight (for e.g., from 2 to 20% by weight, from 2 to 18% by weight, from 2 to 15% by weight, from 2 to 10% by weight, from 2 to 7.5% by weight, from 3 to 20% by weight, from 3 to 15% by weight, from 3 to 10% by weight, from 4 to 20% by weight, from 4 to 10% by weight, from 5% to 25% by weight, from 5% to 15% by weight, or from 7.5 to 15% by weight), based on the total weight of the release coating.

The weight ratio of lecithin to the total amount of surfactant in the release coatings can be 1:2 or greater, such as 1:1 or greater, 1.5:1 or greater, 2:1 or greater, 3:1 or greater, 4:1 or greater, 5:1 or greater, 6:1 or greater, 7:1 or greater, 8:1 or greater, 9:1 or greater, or 10:1 or greater. In some embodiments, the weight ratio of lecithin to the total amount of surfactant can be from 1:2 to 20:1, from 1:2 to 15:1, from 1:2 to 10:1, from 1:1 to 20:1, from 1:1 to 15:1, from 1:1 to 10:1, from 1:1 to 7.5:1, from 1:1 to 5:1, or from 1:2 to 2:1.

When the release coatings are formulated as a concentrate, the lecithin can be present in an amount of 5% by weight or greater (for e.g., 10% by weight or greater, 15% by weight or greater, 20% by weight or greater, 25% by weight or greater, 30% by weight or greater, 35% by weight or greater, 40% by weight or greater, 45% by weight or greater, or 50% by weight or greater), based on the total weight of the release coating concentrate. In some embodiments, the lecithin can be present in an amount from greater than 5 to 50% by weight (for e.g., from 5 to 45% by weight, from 5 to 40% by weight, from 10 to 50% by weight, from 10 to 45% by weight, from 10 to 40% by weight, from 15 to 50% by weight, from 15 to 40% by weight, or from 15 to 35% by weight), based on the total weight of the release coating concentrate.

Oil

The release coatings can further comprise an oil. The oil can be derived from animals or plants, including but not limited to fish oils, liquefied animal fats, or combinations thereof. The oil may be hydrogenated, non-hydrogenated, partially hydrogenated, fractionated, or otherwise modified. In addition, the oil can include fat substitutes, which can be used alternatively or in combination with animal and/or plant oils. A suitable fat substitute is sucrose polyester, such as is available from the Procter & Gamble Co. under the trade name OLEAN® or SALATRIM® which is a brand product from Nabisco. The oil can include one or more of soybean oil, corn oil, cottonseed oil, peanut oil, safflower oil, sunflower oil, palm oil, coconut oil, rice bran oil, rapeseed oil, ground nut oil, grapeseed oil, ghee, canola oil, olive oil, vegetable oil, flax oil, hemp oil, borage oil, avocado oil, pumpkin oil, wheatgerm oil, evening primrose oil, and starflower oil. The oil used in the release coating can be organic.

When present, the oil can be in an amount greater than, equal to, or less than the amount of lecithin. In some instances, the oil can be present in an amount of 25% by weight or less (for e.g., 23% by weight or less, 20% by weight or less, 18% by weight or less, 17% by weight or less, 16% by weight or less, 15% by weight or less, 14% by weight or less, 13% by weight or less, 12% by weight or less, 11% by weight or less, 10% by weight or less, 9% by weight or less, 8% by weight or less, 7% by weight or less, 6% by weight or less, 5% by weight or less, 4% by weight or less, 3% by weight or less, or 2% by weight or less), based on the total weight of the release coating. In some embodiments, the oil can be present in an amount of 0% by weight or greater (for e.g., 0.5% by weight or greater, 1% by weight or greater, 1.5% by weight or greater, 2% by weight or greater, 3% by weight or greater, 4% by weight or greater, 5% by weight or greater, 6% by weight or greater, 7% by weight or greater, 8% by weight or greater, 9% by weight or greater, 10% by weight or greater, 12% by weight or greater, 14% by weight or greater, 15% by weight or greater, 16% by weight or greater, 18% by weight or greater, 20% by weight or greater, or 25% by weight or greater), based on the total weight of the release coating. In some embodiments, the oil can be present in an amount from 0 to 25% by weight (for e.g., from 2 to 25% by weight, from 2 to 20% by weight, from 2 to 18% by weight, from 2 to 15% by weight, from 2 to 10% by weight, from 2 to 7.5% by weight, from 3 to 20% by weight, from 3 to 15% by weight, from 3 to 10% by weight, from 4 to 20% by weight, from 4 to 10% by weight, from 5% to 25% by weight, from 5% to 15% by weight, or from 7.5% to 15% by weight), based on the total weight of the release coating.

The weight ratio of oil and lecithin to the surfactant can be 1:2 or greater, such as 1:1 or greater, 1.5:1 or greater, 2:1 or greater, 3:1 or greater, 4:1 or greater, 5:1 or greater, 6:1 or greater, 7:1 or greater, 8:1 or greater, 9:1 or greater, or 10:1 or greater. In some embodiments, the weight ratio of oil and lecithin to the surfactant can be from 1:2 to 20:1, from 1:2 to 15:1, from 1:2 to 10:1, from 1:1 to 20:1, from 1:1 to 15:1, from 1:1 to 10:1, from 1:1 to 7.5:1, from 1:1 to 5:1, from 1:2 to 2:1, from 2:1 to 20:1, from 2:1 to 10:1, from 2:1 to 5:1, or from 1:1 to 3:1.

When the release coatings are formulated as a concentrate, the oil can be present in an amount of 5% by weight or greater (for e.g., 10% by weight or greater, 15% by weight or greater, 20% by weight or greater, 25% by weight or greater, 30% by weight or greater, 35% by weight or greater, 40% by weight or greater, 45% by weight or greater, or 50% by weight or greater), based on the total weight of the release coating concentrate. In some embodiments, the oil can be present in an amount from greater than 5 to 50% by weight (for e.g., from 5 to 45% by weight, from 5 to 40% by weight, from 10 to 50% by weight, from 10 to 45% by weight, from 10 to 40% by weight, from 15 to 50% by weight, from 15 to 40% by weight, or from 15 to 35% by weight), based on the total weight of the release coating concentrate.

In some embodiments of the release coatings, an oil is not present. In some embodiments, the only oil present may be present in the lecithin included in the coating.

Preservative and Other Additives

The release coatings can further comprise a preservative and optionally one or more additional additives. The preservative is preferably derived from a natural source and can be an acidic preservative. For example, the preservative can include acetic acid, citric acid, sodium benzoate, benzoic acid, or mixtures thereof. Acetic acid (vinegar), for example, can be included in the release coatings. Additional additives present in the release coatings can include an antimicrobial agent, a coloring agent, an antioxidant, a flavoring agent, or a combination thereof.

Preferably, all components in the release coatings are food grade or generally recognized as safe (GRAS), as determined under sections 201(s) and 409 of the Federal Food, Drug, and Cosmetic Act (the Act), and more preferably organic.

Methods of Making

Methods of preparing the release coatings are also disclosed. The method can include mixing in a high shear mixer, water, a surfactant comprising a mixture of saponin glycosides, and lecithin to form the release coating. In some examples, the method can include mixing from 40% to 95% by weight water, from 2% to 20% by weight of the saponin extract derived from the *Quillaja* plant, from 2% to 25% by weight of lecithin, and from 0.1% to 5% by weight of a preservative such as acetic acid. The release coating may also be formulated as a concentrate and can include mixing 70% or less by weight water, from 3% to 50% by weight of the surfactant comprising saponin glycosides, and from 3% to 50% by weight of lecithin.

The ingredients in the release coatings can be added simultaneously and/or sequentially. In some instances, the order of addition of the ingredients can be important, as this may alter the stability of the emulsion formed. In these embodiments, the composition can be made in two steps. First a premix is formed. The pre-mix can include water, the surfactant comprising a mixture of saponin glycosides as described herein, and lecithin or an oil. In some cases, a preservative can be included in the pre-mix.

In the premix, the ingredients are mixed in a high speed, high shear mixer in the relative ratios desired in the final release coatings. For example, a mixing speed of at least 2000 RPM can be used. The mixing time is dependent on the equipment and the composition. The components should be mixed until the lecithin or oil is finely dispersed with the surfactant and the optional preservative. A mixing time of at least three (3) minutes or more is preferable. However, the size of the mixing vessel and the size and type of the high shear mixing head and the horsepower of the mixing motor must be balanced according to normal mixing engineering calculations. The high shear mixing causes the lecithin or oil and surfactant to become finely and thoroughly dispersed within the water. This mixing can be done either under vacuum or at room conditions, desirably, at a temperature of 65° F. or above. If the mixing is not done under vacuum, air can be entrained in the premix. This can result in the production of varying amounts of foam in the premix. The foam is minimized through mixing under vacuum. The percentages of ingredients in the premix can vary from 0-50% lecithin, 0-50% oil, 2-40% surfactant, 0-5% preservative, and 10-95% water, depending upon the desired final composition of the release coatings.

The premix phase aids in the production of a long-term stable release coating. Integrally mixing the surfactant with the lecithin or oil under the high shear conditions actually results in the admixture becoming both dispersible and soluble in water. Desirably, the premix should be aged, preferably for about 12 hours or longer or about 24 hours or longer, prior to use in formulating the release coating. Aging can avoid separation of the product either immediately after manufacture or several weeks or months after manufacture. After the premix has been produced and has been allowed to age, the premix is combined with a preservative and/or additional water. In this step, the additional water and aged premix can be introduced simultaneously or sequentially into another high speed, high shear mixing vessel under agitation. The size of the mixing vessel, size and type of the mixing head and horsepower of the mixing motor should be balanced according to normal engineering calculations. An oil may also be added to the pre-mix. Preferably, the oil is mixed with the pre-mix under high shear.

The components are mixed under high speed, high shear conditions for a sufficient time for all components to be properly dispersed or solubilized without the formation of excessive foam during the mixing operation. The mixing time can vary depending on the equipment used and the particular composition of the release coating. Different times may be used depending on the equipment and mixing speed and shear and composition. The resulting product is storage stable at room temperature for 6 months or longer, preferably 12 months or longer.

As described herein, the release coating can be an oil-in-water emulsion, which is formed when oil molecules are surrounded by water molecules. To achieve a stable emulsion, the size of the molecular clusters should be reduced as much as possible. Such a composition will freely mix with water and remain stable.

The release coating can comprise droplets. The droplets can have a median droplet diameter of from 0.1 µm to 30 µm, from 0.1 µm to 25 µm, from 1 µm to 25 µm, from 1 µm to 20 µm, from 1 µm to 15 µm, such as from 1 µm to 10 µm, 3 µm to 20 µm, from 3 µm to 15 µm, from 4 µm to 15 µm, or from 4 µm to 10 µm, in some embodiments, at least 80% of the droplets can have a droplet size of below 100 µm (for e.g., from 0.1 to 100 µm, from 1 to 100 µm, from 1 to 50 µm, from 10 to 100 µm, from 10 to 50 µm, or from 10 to 30 µm). The median droplet diameter of the release coatings can be determined by scanning electron microscopy (SEM) or transmission electron microscopy (TEM).

The release coatings can be prepared such that the viscosity is from 10 to 10,000 cp at 20° C. In some embodiments, the release coatings can have a viscosity of 50 cp or greater, 100 cp or greater, 150 cp or greater, 200 cp or greater, 250 cp or greater, 300 cp or greater, 350 cp or greater, 400 cp or greater, 450 cp or greater, 500 cp or greater, 600 cp or greater, 700 cp or greater, 800 cp or greater, 900 cp or greater, 1000 cp or greater, 1500 cp or greater, 2000 cp or greater, or 2500 cp or greater, at 20° C. In some embodiments, the release coatings can have a viscosity of 10,000 cp or less, 8000 cp or less, 5000 cp or less, 2500 cp or less, 2000 cp or less, 1500 cp or less, 1000 cp or less, 900 cp or less, 800 cp or less, 750 cp or less, 700 cp or less, 650 cp or less, 600 cp or less, 550 cp or less, 500 cp or less, 400 cp or less, 250 cp or greater, 300 cp or less, 200 cp or less, 100 cp or less, or 50 cp or less, at 20° C.

Method of Using

The release coatings described herein are storage stable and can be used in cooking, particularly in baking as a release agent or as a cooking surface cleaner. Particularly, the release coatings described herein are useful to reduce or prevent build-up on a cooking surface or to clean a cooking surface that has, for example, a carbon and/or residual product buildup. For example, the high heats used in the cooking process have a tendency to cause the organic compounds in the cooking product (oils, flour, sugar, etc.) to degrade. These degradation compounds can produce a medium to dark coating on the baking surfaces. Over time, these coatings reduce the effectiveness of the release coatings and result in the need to chemically or mechanically clean the buildup off the baking surface. In addition, in glazing baking pans, these degradation compounds also can destroy the glaze coating, ultimately necessitating an expensive re-glazing of the baking pan. Further, these compounds can build up on oven working parts and increase the risk of fires in the oven itself. The release coatings described herein, when applied, reduce or prevent build up on cooking surfaces and may also remove accumulated buildup from cooking surfaces.

The release coatings can be used on any cooking surface including baking, broiling, grilling, and dehydrating surfaces. The cooking surface can be derived from a glass, a metal, a glazed metal, a polymer (such as silicone, polytetrafluoroethylene), a composite (including natural and synthetic composites such as ceramic), or a combination thereof (such as composite coated with PTFE).

In the methods of using the release coatings described herein, the release coating can be applied to a cooking surface, preferably a surface that will be used in baking bakery products such as breads, fruit pastries, bagels, waffles and the like. A thin film of the release coating can be applied either by spraying such as through a nozzle or brushing on a cooking surface, but are typically applied under pressure via a spray system, onto the cooking surfaces. Accordingly, the release coating can be mixed with a propellant prior to applying to the cooking surface. The propellant can be selected from compressed air, ethanol, nitrogen, carbon dioxide, nitrous oxide, hydrofluoroalkanes (HFA), 1,1,1,2,-tetrafluoroethane, 1,1,1,2,3,3,3-heptafluoropropane, or combinations thereof. The release coating can then be applied by spraying such as from an aerosol container. In some examples, the release coating can be an aerosol composition comprising an aerosol container containing the release coating and a propellant.

When used commercially, a controller can be used to regulate the flow of the release agent. The controller can assume many forms. In some examples, the controller can include a programmable logic controller running software directing its activity. It can be set to regulate the flow of release agent according to the throughput of the product being made, as well as other conditions such as temperature or humidity. At the appropriate interval, the software can switch on the flow of release agent to allow an appropriate volume to be sprayed onto the cooking surface. Alternately, the release coating can be sprayed on the food product, to coat the external surfaces of the food product. The food product is then deposited onto the cooking surface (such as in a baking pan) with the release agent already applied. Thus, there is no need to coat the cooking surface itself.

After the release coating is applied, the coating can be left to set prior to cooking or cleaning. In the methods of cleaning a cooking surface that has buildup, the methods can further include heating the cooking surface and then wiping or washing the cooking surface to remove the buildup.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Organic Water-Based Release Agent

A water-based release agent that has the same functional release capabilities/characteristics as a commercially available Amarnakote™ water-based release agent that can be organically certified was prepared.

Materials and Methods: water-based release agent were prepared using several organic emulsifiers—milk proteins (whey, casein), gum acacia, lecithin, pea protein, and *Quillaja* extract and subsequently compared to the commercially available Amarnakote™ water-based release agent. Emulsions were prepared with each organic emulsifier with varying oil and lecithin concentrations. The samples were evaluated for stability via microscope and centrifuge analysis.

Formulation: *Quillaja* was the only organic emulsifier that worked among other organic emulsifier options (see FIGS. 1A-1D).

Recipe Development: Initial test samples were made using a 4:1 oil and lecithin to *Quillaja* extract ratio. See Table 1. Centrifuge stability results of these tests showed the oil % can be less than or equal to lecithin % and the lecithin % is preferably 15% or below for viscosity purposes. Using these initial results, the recipe was further optimized for stability/release.

TABLE 1

Test samples for centrifuge stability.

| Test | Lecithin % | Oil % | Creaming Level |
|---|---|---|---|
| 1 | 10 | 0 | Low |
| 2 | 5 | 5 | Medium Low |
| 3 | 5 | 15 | High |
| 4 | 10 | 5 | Medium Low |
| 5 | 15 | 10 | Medium |

A further twenty-seven (27) test samples were prepared with varying amounts of oil, lecithin, and *Quillaja* extract. See Table 2. The output samples were analyzed for stability via centrifuge. Successful samples (low to no creaming and no phase separation) were investigated for droplet size analysis.

TABLE 2

Test samples for recipe stability and release.

| Factor | Low Value | Medium Value | High Value |
|---|---|---|---|
| Oil % | 2.5% | 5% | 7.5% |
| Lecithin % | 7.5% | 10% | 12.5% |
| Oil:LN to Q Ratio | 2:1 | 3.5:1 | 5:1 |

Out of 27 total runs, 5 samples were very stable, 6 moderately stable, and 16 unstable. For maximum stability, oil % is preferably kept at 5% or less, lecithin % is preferably kept at 10% or less, *Quillaja* % can be as low as 2% (or ratio as low as 5:1), and higher emulsifier % does not always translate to better stability. An optimized recipe includes 8.5% organic sunflower lecithin, no oil, and 2% *Quillaja* extract. Little to no creaming and no phase separation after 1 year accelerated shelf life study were obtained. Similar viscosity, spray pattern, and release results compared to the commercial water-based release agent were obtained. The order of addition of ingredients seem to make a difference with emulsion stability and shelf life.

Order of Addition: Five set of samples with varying order of adding the release coating ingredients were prepared as shown in Table 3.

TABLE 3

Recipes of samples prepared.

| | Premix 1 | Premix 2 | Premix 3 | Premix 4 | Premix 5 |
|---|---|---|---|---|---|
| Pre-mix | Water *Quillaja* Oil | Two steps: a. Water and *Quillaja* b. Lecithin and Oil | None | Water *Quillaja* Lecithin | Water *Quillaja* Lecithin |
| Final Mix | Two steps: a. Lecithin added and mixed. b. Vinegar added and mixed. | Two steps: a. Both premixes combined and mixed. b. Vinegar added and mixed. | Four Steps a. *Quillaja* added to water. b. Oil added and mixed. c. Lecithin added and mixed. d. Vinegar added and mixed. | Two steps: a. Oil added and mixed. b. Vinegar added and mixed. | Vinegar added and mix. |

Figure 2A:
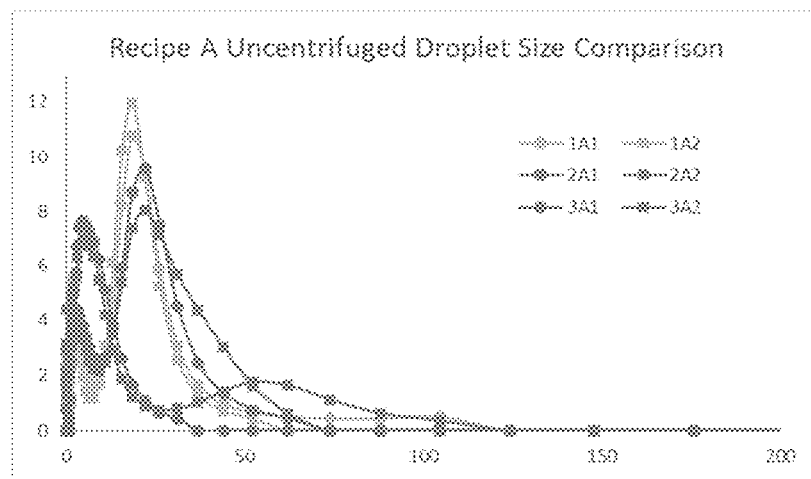
FIGS. 2A-2C are graphs showing the droplet size of uncentrifuged release coating samples prepared from Premix 1 (FIG. 2A), Premix 2 (FIG. 2B), and Premix 3 (FIG. 2C).
Figure 2B:
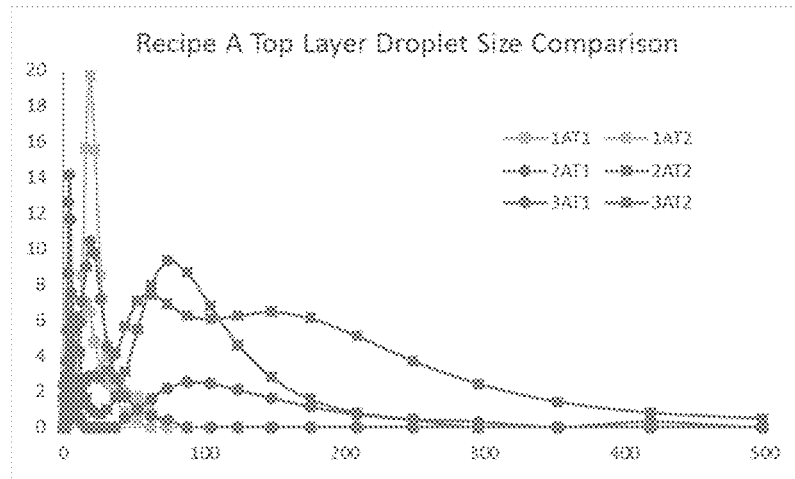
Figure 2C:
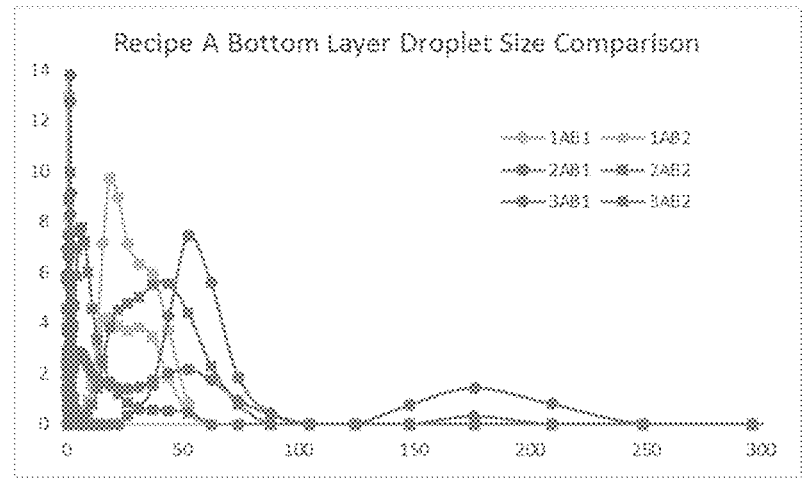
Figures 3A, 3B, 3C:
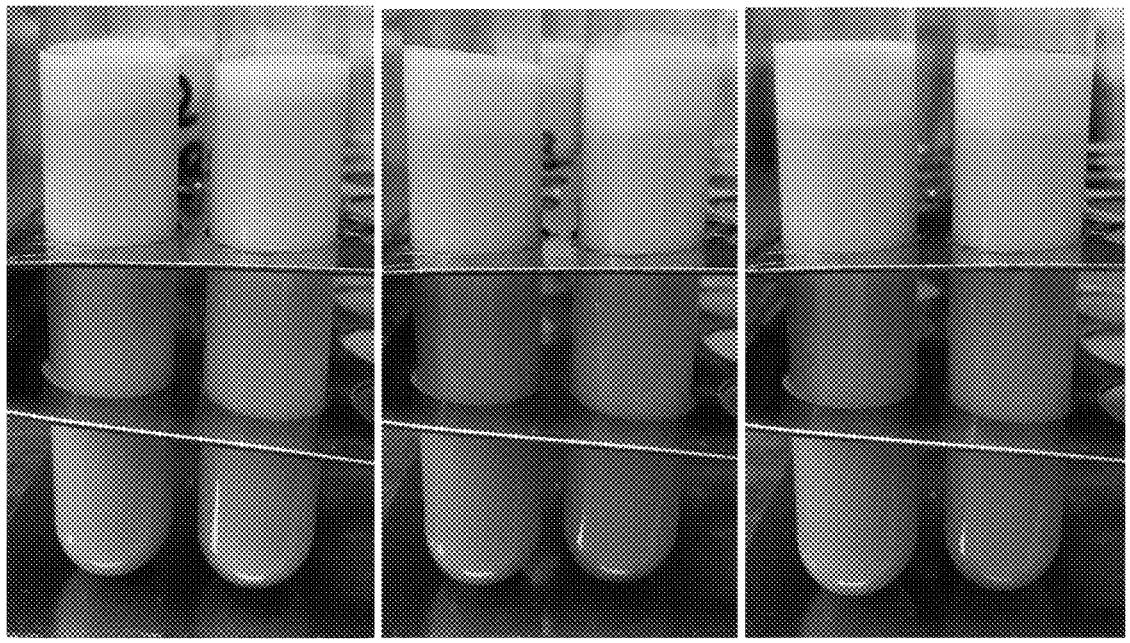
FIGS. 3A-3E are images showing centrifuged release coating samples prepared from Premix 1 (FIG. 3A), Premix 2 (FIG. 3B), Premix 3 (FIG. 3C), Premix 4 (FIG. 3D), and Premix 5 (FIG. 3E).
Figures 3D, 3E:
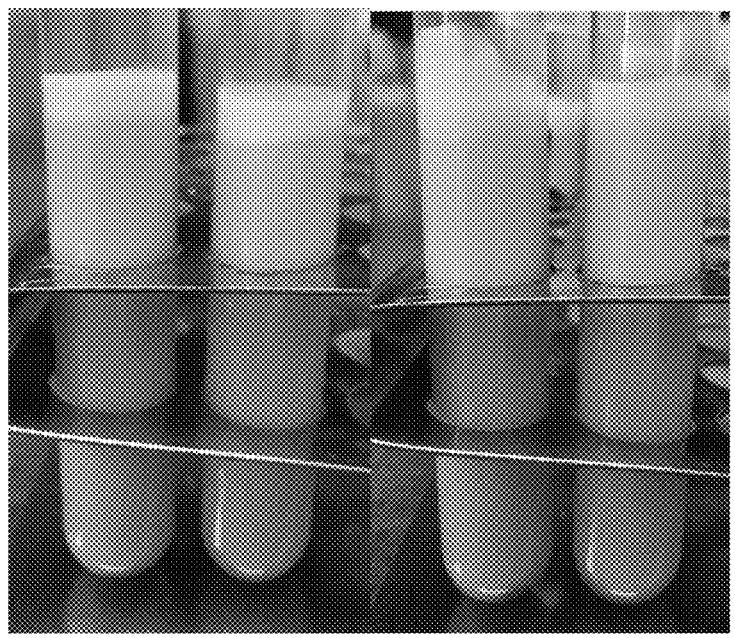

*Quillaja* added in an amount of 2% by weight; lecithin added in an amount of 8.5% by weight; oil added in an amount of 5% by weight The droplet size of the uncentrifuged samples were determined and shown in FIGS. 2A-2C for Premix 1-3, respectively. The samples were centrifuged for 20 minutes at 3500 RPM. The centrifuged samples are shown in FIGS. 3A-3E for Premix 1-5, respectively.

Example 2: Method for Dehydrating Apples Using the Organic Water-Based Release Agent Materials and Methods: Apple slices were cubed into about ¼" cubes using a cutter. A water-based release agent comprising lecithin, *Quillaja* extract, oil, water, and preservative was sprayed onto perforated stainless steel dehydrating trays. A known weight of the cubed apple slices into were sprinkled onto the sprayed trays. The trays were placed into a dehydrator and the apples dehydrated for 4 hours at 140° F. The trays were allowed to sit in dehydrator to cool down. The cooled trays were flipped upside down to release apples from the tray. The weight of the apples that were stuck (not released) on the tray was determined and the percentage of apples released calculated by comparing weight of the released apples to weight of the total dried apples.

Figure 4:
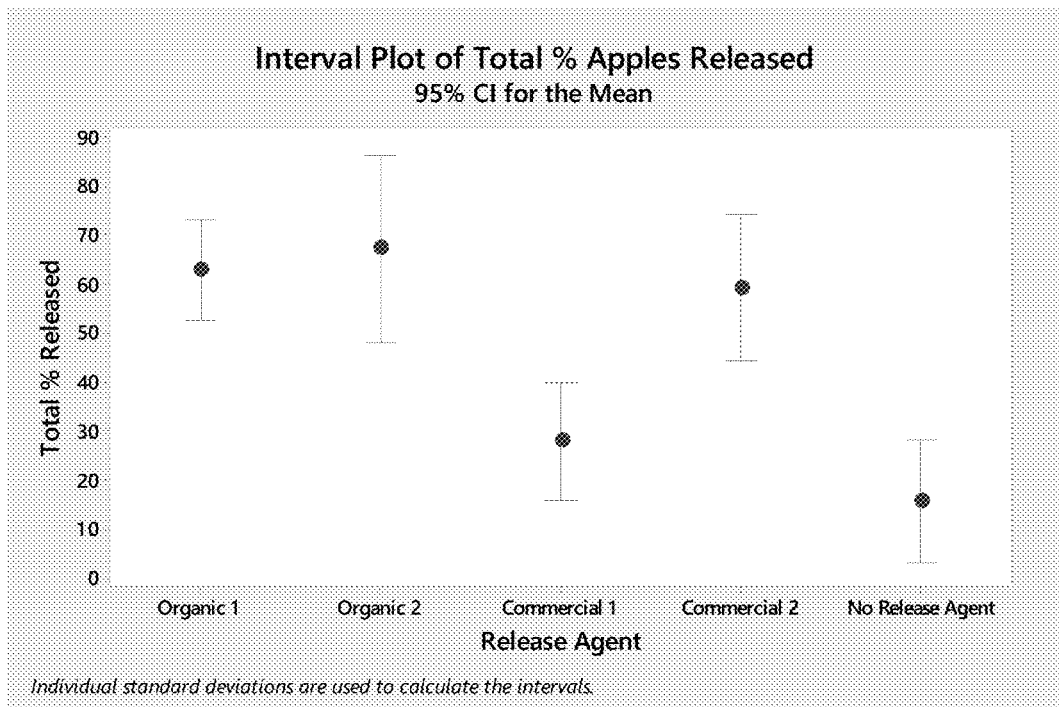
FIG. 4 is a graph comparing the total percentage apples released from a stainless steel tray coated with an inventive water-based ('organic') release agent or a commercially available non-organic water-based release coating (having 40% by weight or greater oil as the continuous phase).

Results: FIG. 4 is a graph showing the total percentage apples released from the stainless steel tray. The graph compares the release properties of the inventive water-based ('organic') release agent to that of commercially available water-based release coating (that is not organically certified). The first commercially available water-based release coating (Commercial 1) incudes water, surfactant, oil, and lecithin. The second commercially available water-based release coating (Commercial 2) incudes water, surfactant, oil, and lecithin. The water-based release agent has the same functional release capabilities/characteristics as the commercially available water-based release agent.

Figure 5:
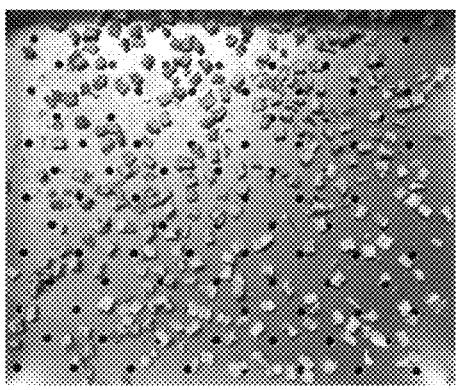
FIG. 5 shows images of a stainless steel tray coated with water-based ('organic') release agent before release (top) or after release (bottom) of dehydrated apples.
Figure 5:
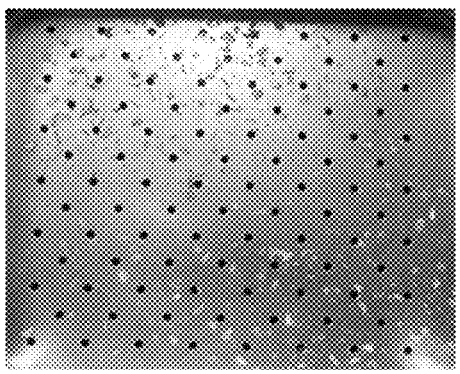

FIG. 5 include images showing the stainless steel tray coated with the water-based ('organic') release agent before release (top) or after release (bottom) of dehydrated apples.

Embodiments of the Disclosure

Disclosed herein are release coating comprising a blend of: water; a surfactant comprising a mixture of saponin glycosides; and lecithin.

Also disclosed are release coating concentrate, comprising: less than 70% by weight water; from 3% to 50% by weight of a surfactant comprising a mixture of saponin glycosides; from 3% to 50% by weight of lecithin; and from 0.1% to 5% by weight of acetic acid.

Further disclosed are methods of preparing the release coating comprising: mixing in a high shear mixer, water, a surfactant comprising a mixture of saponin glycosides, and lecithin to form the release coating.

The release coating of any one of the preceding embodiments, wherein the water is present in an amount of 40% by weight or greater, 50% by weight or greater, 75% by weight or greater, 85% by weight or greater, from 40% to 95% by weight, or from 75% to 90% by weight, based on the total weight of the release coating.

The release coating of any one of the preceding embodiments, wherein the mixture of saponin glycosides are present as a saponin extract derived from a *Quillaja* plant.

The release coating of any one of the preceding embodiments, wherein the surfactant is present in an amount of 20% by weight or less, 15% by weight or less, 10% by weight or less, from 1% to 20% by weight, from 1% to 15% by weight, or from 1% to 10% by weight, based on the total weight of the release coating.

The release coating of any one of the preceding embodiments, wherein the surfactant does not comprise a synthetically derived surfactant.

The release coating of any one of the preceding embodiments, wherein the saponin extract derived from the *Quillaja* plant comprises at least 10% by weight sapogenin content.

The release coating of any one of the preceding embodiments, wherein the lecithin is an unmodified lecithin derived from a plant source, such as from sunflower, soybean, rapeseed, corn, or cottonseed, preferably sunflower lecithin.

The release coating of any one of the preceding embodiments, wherein the lecithin is present in an amount of 25% by weight or less, 20% by weight or less, 15% by weight or less, 10% by weight or less, from 5% to 25% by weight, from 5% to 15% by weight, or from 7.5% to 15% by weight, based on the total weight of the release coating.

The release coating of any one of the preceding embodiments, wherein the weight ratio of lecithin to the total amount of surfactant is from 1:2 to 10:1 or from 1:1 to 7.5:1.

The release coating of any one of the preceding embodiments, wherein the release coating further comprises an oil.

The release coating of any one of the preceding embodiments, wherein the oil is present in an amount of 25% by weight or less, 20% by weight or less, 15% by weight or less, 10% by weight or less, 7.5% by weight or less, from 0.5% to 25% by weight, from 0.5% to 15% by weight, from 0.5% to 7.5% by weight, or from 0.5% to 5% by weight, based on the total weight of the release coating.

The release coating of any one of the preceding embodiments, wherein the weight ratio of lecithin and oil to the surfactant is from 1:2 to 20:1, from 1:2 to 10:1, from 1:1 to 10:1, or from 2:1 to 5:1.

The release coating of any one of the preceding embodiments, wherein the oil comprises one or more of a plant derived oil or an animal derived oil, such as soybean oil, corn oil, cottonseed oil, peanut oil, safflower oil, sunflower oil, palm oil, coconut oil, rice bran oil, rapeseed oil, ground nut oil, grapeseed oil, ghee, canola oil, olive oil, vegetable oil, flax oil, hemp oil, borage oil, avocado oil, pumpkin oil, wheatgerm oil, evening primrose oil, and starflower oil, wherein the oil may be at least partially hydrogenated, or fractionated.

The release coating of any one of the preceding embodiments, wherein the release coating does not comprise an oil.

The release coating of any one of the preceding embodiments, further comprising a preservative.

The release coating of any one of the preceding embodiments, wherein the preservative is selected from acetic acid, citric acid, sodium benzoate, benzoic acid, or mixtures thereof.

The release coating of any one of the preceding embodiments, comprising: from 40% to 95% by weight water; from 2% to 20% by weight of the saponin extract derived from the *Quillaja* plant; from 2% to 25% by weight of lecithin; and from 0.1% to 5% by weight of acetic acid.

The release coating of any one of the preceding embodiments, further comprising an antimicrobial agent, a coloring agent, an antioxidant, a flavoring agent, or a combination thereof.

The release coating of any one of the preceding embodiments, wherein all components in the release coating are food grade or generally recognized as safe (GRAS), as determined under sections 201(s) and 409 of the Federal Food, Drug, and Cosmetic Act (the Act).

The release coating of any one of the preceding embodiments, wherein release coating is an oil-in-water emulsion, wherein the emulsion is stable for at least 6 months.

The release coating of any one of the preceding embodiments, wherein release coating has a viscosity of from 10 to 10,000 cps at 20° C.

The release coating of any one of the preceding embodiments, wherein the coating is an aerosol composition comprising an aerosol container containing the release coating and a propellant.

The methods of preparing the release coating of any one of the preceding embodiments, can comprise mixing in a high shear mixer, water, a surfactant comprising saponin glycosides, and oil to form a pre-mix; aging the pre-mix for at least 12 hours; and mixing in a high shear mixer, the aged pre-mix, lecithin, additional water, and a preservative to form the release coating.

The methods of preparing the release coating of any one of the preceding embodiments, can comprise mixing in a high shear mixer, water, a surfactant comprising saponin glycosides and lecithin, to form a pre-mix; aging the pre-mix for at least 12 hours; and mixing in a high shear mixer, the aged pre-mix, a preservative, and additional water to form the release coating.

The methods of preparing the release coating of any one of the preceding embodiments, can further comprise mixing an oil with the premix.

The methods of preparing the release coating of any one of the preceding embodiments, wherein the release coating comprises droplets, wherein at least 80% of the droplets have a droplet size of below 100 microns, from 0.1-100 microns or from 10-50 microns.

The methods of preparing the release coating of any one of the preceding embodiments, wherein the release coating comprises droplets, wherein the droplets have a median droplet size of from 0.1 to 30.0 microns.

Methods of reducing or preventing build-up on a cooking surface comprising: applying the release coating according to any one of the preceding embodiments to the cooking surface; and heating a cooking product on the cooking surface, whereby build-up is reduced compared to an uncoated cooking surface or prevented during the cooking process are disclosed.

Methods of cleaning a cooking surface that has a buildup comprising: applying the release coating according to any one of the preceding embodiments to the cooking surface; allowing the release coating to set; and wiping or washing the cooking surface to remove the buildup are disclosed.

The method of any one of the preceding embodiments, wherein method further comprises heating the cooking surface prior to or after applying the release coating.

The method of any one of the preceding embodiments, wherein the release coating is allowed to set for at least 1 minute.

The method of any one of the preceding embodiments, wherein the cooking surface is a glass, a metal, a glazed metal, a polymer, a composite, or a combination thereof.

The method of any one of the preceding embodiments, wherein the cooking surface is a baking equipment, such as a band oven, a baking pan, a grilling surface, or a dehydrator surface.

The method of any one of the preceding embodiments, further comprising mixing the release coating with a propellant prior to the applying step.

The method of any one of the preceding embodiments, wherein the propellant is compressed air, ethanol, nitrogen, carbon dioxide, nitrous oxide, hydrofluoroalkanes (HFA), 1,1,1,2,-tetrafluoroethane, 1,1,1,2,3,3,3-heptafluoropropane, or combinations thereof.

The method of any one of the preceding embodiments, wherein applying the release coating is performed by spraying.

The method of any one of the preceding embodiments, wherein the method of spraying is from a spray system or an aerosol container.

The method of any one of the preceding embodiments, wherein applying the release coating is performed by brushing.

The invention claimed is:

1. A release coating comprising a blend of:
   a) from 40% to less than 70% by weight water, based on the total weight of the release coating;
   b) from 2% to 20% by weight of saponin glycosides derived from a *Quillaja* plant, based on the total weight of the release coating; and
   c) lecithin.

2. The release coating of claim 1, wherein the saponin glycosides is a component of a surfactant, the surfactant present in an amount from 2% to 20% by weight, based on the total weight of the release coating.

3. The release coating of claim 2, wherein the surfactant does not comprise a synthetically derived surfactant.

4. The release coating of claim 1, wherein the lecithin is an unmodified lecithin derived from a plant source.

5. The release coating of claim 1, wherein the lecithin is present in an amount from 5% to 25% by weight, based on the total weight of the release coating.

6. The release coating of claim 1, wherein the release coating further comprises an oil, the oil selected from soybean oil, corn oil, cottonseed oil, peanut oil, safflower oil, palm oil, coconut oil, rice bran oil, rapeseed oil, ground nut oil, grapeseed oil, ghee, canola oil, olive oil, flax oil, hemp oil, borage oil, avocado oil, pumpkin oil, wheatgerm oil, evening primrose oil, or starflower oil.

7. The release coating of claim 6, wherein the oil is present in an amount from 0.5% to 25% by weight, based on the total weight of the release coating.

8. The release coating of claim 1, further comprising a preservative, wherein the preservative is selected from acetic acid, citric acid, sodium benzoate, benzoic acid, or mixtures thereof.

9. The release coating of claim 1, wherein the release coating is an oil-in-water emulsion, wherein the emulsion is stable for at least 6 months.

10. An aerosol composition comprising an aerosol container containing a release coating of claim 1 and a propellant.

11. A release coating concentrate, comprising:
    a) less than 70% by weight water;
    b) from 3% to 50% by weight of saponin glycosides derived from a *Quillaja* plant, the saponin glycosides serving as a surfactant;
    c) from 3% to 50% by weight of lecithin; and
    d) from 0.1% to 5% by weight of a preservative.

12. The release coating of claim 1, wherein the release coating further comprises canola oil, the canola oil present in an amount from 0.5% to 10% by weight, based on the total weight of the release coating.

13. The release coating concentrate of claim 11, wherein the release coating further comprises canola oil, the canola oil present in an amount from 0.5% to 10% by weight, based on the total weight of the release coating.

* * * * *